(12) United States Patent
Gaussens et al.

(10) Patent No.: US 12,734,766 B2
(45) Date of Patent: Sep. 15, 2026

(54) IMPREGNATING COATING LAYER FOR INSULATING SHEETSAND MULTILAYER LAMINATES

(71) Applicants: DUPONT SAFETY & CONSTRUCTION, INC., Wilmington, DE (US); COVEME S.P.A., Gorizia (IT)

(72) Inventors: Benjamin Gaussens, Meyrin (CH); Giorgio Patrizio Vercesi, Meyrin (CH); Luigi D'Arco, Gorizia (IT)

(73) Assignees: DUPONT SAFETY & CONSTRUCTION, INC., Wilmington, DE (US); COVEME S.P.A, Gorizia (IT)

( * ) Notice: Subject to any disclaimer, the term of this patent is extended or adjusted under 35 U.S.C. 154(b) by 257 days.

(21) Appl. No.: 18/578,802

(22) PCT Filed: Jul. 18, 2022

(86) PCT No.: PCT/US2022/073827
§ 371 (c)(1),
(2) Date: Jan. 12, 2024

(87) PCT Pub. No.: WO2023/004278
PCT Pub. Date: Jan. 26, 2023

(65) Prior Publication Data

US 2024/0351318 A1 Oct. 24, 2024

(30) Foreign Application Priority Data

Jul. 19, 2021 (IT) ........................ 102021000018965

(51) Int. Cl.
*B29C 70/50* (2006.01)
*B29C 70/18* (2006.01)
(Continued)

(52) U.S. Cl.
CPC .............. *B29C 70/18* (2013.01); *B29C 70/50* (2013.01); *B32B 5/022* (2013.01); *B32B 5/265* (2021.05);
(Continued)

(58) Field of Classification Search
CPC . H02K 1/06; H01B 3/04; H01B 3/447; H01B 3/52; D21H 27/00; D21H 27/30;
(Continued)

(56) References Cited

U.S. PATENT DOCUMENTS

| | | |
|---|---|---|
| 3,063,966 A | 11/1962 | Kwolek et al. |
| 3,227,793 A | 1/1966 | Cipriani |

(Continued)

FOREIGN PATENT DOCUMENTS

| | | |
|---|---|---|
| CN | 102983692 A | 3/2013 |
| CN | 110080037 A | 8/2019 |

(Continued)

OTHER PUBLICATIONS

PCT International Search Report for Application No. PCT/US2022/073825; Philippe Ponsaud, Authorized Officer; ISA/EPO; Oct. 13, 2022.

(Continued)

*Primary Examiner* — Camie S Thompson
(74) *Attorney, Agent, or Firm* — Ram W. Sabnis

(57) ABSTRACT

The present invention relates to a multilayer laminate comprising at least three layers, wherein the two outer layers are each nonwoven backing sheet (7) containing a crystalline silicate mineral powder impregnated with a coating of an impregnating resin based on acrylate derivatives, which is suitable for increasing the compactness of the insulating sheet and for preventing the silicate mineral powder from detaching from the aramid fiber during use; the multilayer laminate having an inner layer being free of crystalline
(Continued)

silicate mineral powder that comprises either i) heat resistant floc and binder, or ii) heat resistant polymeric film. The impregnating resin also comprises an organic solvent, which is capable of reducing the viscosity thereof and of promoting its deep penetration into the sheet. In addition, the impregnating resin comprises a UV polymerization photoinitiator which is suitable for curing the resin, only after said resin has been applied to the sheet and has penetrated deeply therein. The invention also describes the method for impregnating the insulating sheets.

16 Claims, 2 Drawing Sheets

(51) Int. Cl.

| | |
|---|---|
| ***B29K 279/00*** | (2006.01) |
| ***B29K 309/10*** | (2006.01) |
| ***B29L 31/00*** | (2006.01) |
| ***B29L 31/34*** | (2006.01) |
| ***B32B 5/02*** | (2006.01) |
| ***B32B 5/26*** | (2006.01) |
| ***B32B 27/12*** | (2006.01) |
| ***B32B 27/18*** | (2006.01) |
| ***B32B 37/24*** | (2006.01) |
| ***B32B 38/08*** | (2006.01) |
| ***D21H 13/26*** | (2006.01) |
| ***D21H 17/55*** | (2006.01) |
| ***D21H 27/38*** | (2006.01) |
| ***H02K 1/06*** | (2006.01) |

(52) U.S. Cl.

CPC .............. *B32B 27/12* (2013.01); *B32B 27/18* (2013.01); *B32B 37/24* (2013.01); *B32B 38/08* (2013.01); *D21H 13/26* (2013.01); *D21H 17/55* (2013.01); *D21H 27/38* (2013.01); *B29K 2279/085* (2013.01); *B29K 2309/10* (2013.01); *B29K 2995/0097* (2013.01); *B29L 2031/3412* (2013.01); *B29L 2031/749* (2013.01); *B32B 2037/243* (2013.01); *B32B 2250/03* (2013.01); *B32B 2250/40* (2013.01); *B32B 2260/021* (2013.01); *B32B 2260/046* (2013.01); *B32B 2262/0269* (2013.01); *B32B 2264/1023* (2020.08); *B32B 2264/1026* (2020.08); *B32B 2264/104* (2013.01); *B32B 2305/18* (2013.01); *B32B 2307/306* (2013.01); *B32B 2377/00* (2013.01); *B32B 2457/00* (2013.01); *H02K 1/06* (2013.01)

(58) Field of Classification Search

CPC ........ D21H 27/32; D21H 27/34; D21H 27/38; D21H 17/37; D21H 17/65; D21H 17/68; D21H 13/26; B32B 2377/00; B32B 2307/306; B32B 2305/18; B32B 2264/104; B32B 37/24; B32B 38/08; B32B 2037/243; B32B 2250/03; B32B 2250/40; B32B 2260/046; B32B 2260/0269; B32B 27/12; B32B 27/18; B32B 5/022; B32B 5/265; B32B 2264/1023; B32B 2264/1026; B29L 2031/3412; B29L 2031/749; B29K 2995/0097; B29K 2309/10; B29K 2279/085; B29C 70/18; B29C 70/50

USPC .......................................................... 442/393

See application file for complete search history.

(56) References Cited

U.S. PATENT DOCUMENTS

| | | | |
|---|---|---|---|
| 3,287,324 | A | 11/1966 | Sweeny |
| 3,414,645 | A | 12/1968 | Morgan, Jr. |
| 5,032,453 | A | 7/1991 | Rogler et al. |
| 5,667,743 | A | 9/1997 | Tai et al. |
| 7,399,379 | B2 | 7/2008 | Levit et al. |
| 9,844,928 | B2 | 12/2017 | Duart et al. |
| 10,186,353 | B2 | 1/2019 | Kang et al. |
| 10,336,039 | B2 | 7/2019 | Kang et al. |
| 2012/0156956 | A1 | 6/2012 | Turpin et al. |
| 2013/0196161 | A1 | 8/2013 | Kang et al. |
| 2014/0028140 | A1 | 1/2014 | Mabuchi et al. |
| 2017/0229207 | A1 | 8/2017 | Qu et al. |
| 2020/0295328 | A1 | 9/2020 | Kang |
| 2021/0062429 | A1 | 3/2021 | Wang et al. |

FOREIGN PATENT DOCUMENTS

| | | | |
|---|---|---|---|
| CN | 111118963 | A | 5/2020 |
| EP | 0373137 | A2 | 6/1990 |
| JP | 2000119422 | A | 4/2000 |
| JP | 2000149662 | A | 5/2000 |
| JP | 3660765 | B2 | 6/2005 |
| JP | 2016165808 | A | 9/2016 |
| WO | 2021145097 | A1 | 7/2021 |

OTHER PUBLICATIONS

PCT International Search Report for Application No. PCT/US2022/073827; Philippe Ponsaud, Authorized Officer; ISA/EPO; Oct. 13, 2022.

IMPREGNATING COATING LAYER FOR INSULATING SHEETSAND MULTILAYER LAMINATES

TECHNICAL FIELD

The present invention relates to the field of producing impregnated insulating coating layers. In particular, the present invention relates to multilayer laminates having impregnated coating layers comprising nonwoven sheets containing crystalline silicate mineral powder such as for aramid/mica electrical insulators. Even more particularly, the present invention relates to multilayer laminates having impregnated coating layers made of acrylate resin, for aramid/mica electrical insulators.

PRIOR ART

In recent years, with the rapid development of electrical machines, more and more attention has been paid to materials which have excellent insulating properties and high mechanical properties under extreme working conditions. For example, aramid/mica sheets are used for electrically insulating motors.

Mica has excellent physical, electrical and thermal properties and has high stability and adaptability even at high temperatures; however, it has poor mechanical strength and thus cannot be used directly for making insulating sheets. Mica may advantageously be added to aramid sheets to impart greater resistance to partial discharge to said sheets.

One of the major problems for the production of aramid/mica insulating sheets is that when mica is introduced into the aramid paper structure, it is sparingly cohesive and tends to become detached. The surface of the aramid/mica paper is thus dusty and difficult to laminate and to impregnate with epoxy and polyester resins, or to use as an insulator in a rotating or static electrical machine.

In order to improve the properties of aramid/mica paper, some studies known in the prior art propose the introduction of adhesive layers to increase the surface bonding between the aramid fibers and the mica.

For example, US 2014/0 028 140 A1 describes an aramid/mica tape wrapped around a rotating coil for the purpose of giving it electrical insulation with respect to the exterior. The aramid/mica tape also has a layer of an adhesive resin containing acryloyl-based compounds, which is used for improving the adhesion between the mica and the aramid. However, the adhesive resin layer is applied to the already-formed aramid/mica paper and therefore does not penetrate deeply therein. Thus, the compactness of the aramid/mica sheets is only partially increased.

US 2021/0 062 429 A1, for its part, proposes an alternative method for improving the mechanical properties of aramid/mica sheets, based on the use of aramid nanofibers instead of aramid microfibers, to be incorporated into an insulating sheet containing mica. In this manner, the surface area of interaction between the aramid and the mica is increased and the compactness of the aramid/mica sheets is promoted. However, the process described in US 2021/0 062 429 A1 for making aramid nanofibers is complex, laborious and thus expensive.

SUMMARY

In the light of the abovementioned problems and drawbacks related to the production of insulating sheets, one of the objects of the present invention is to provide multilayer laminates comprising nonwoven sheets containing a crystalline silicate mineral powder, for example mica, characterized by high surface cohesion and a compact surface. For example, one of the objects of the present invention is to provide multilayer laminates comprising aramid/mica insulating sheets, in which the mica particles are stably attached to the aramid fibers, so that they do not become detached during use.

According to one embodiment of the present invention, a multilayer laminate having a first surface and a second surface, the multilayer laminate comprising at least three layers is provided, characterised in that the layers comprise:

a) a first outer layer that is a first nonwoven backing sheet (7) containing a crystalline silicate mineral powder, b) an inner layer that comprises either:
   i) heat resistant floc and binder and being free of crystalline silicate mineral powder, or
   ii) heat resistant polymeric film being free of crystalline silicate mineral powder; and c) a second outer layer that is a second nonwoven backing sheet (7) containing a crystalline silicate mineral powder, wherein first outer layer, the inner layer, and the second outer layer are coextensive with each other and bound together face-to-face, the inner layer being between the first and second outer layers, and wherein the multilayer laminate has a total of 15 to 80 weight percent crystalline silicate mineral powder, based on the total amount of said crystalline silicate mineral powder, floc, and binder in the multilayer laminate, the multilayer laminate also comprising a coating of an impregnating resin based on acrylate derivatives.

This configuration is particularly advantageous in that the nonwoven backing sheets, for instance comprising an aramid paper, containing a crystalline silicate mineral powder are impregnated with a layer of coating resin, which is capable of penetrating deep into the insulating sheets and thus of improving their compactness.

In the multilayer laminate, the combination of an inner layer of either i) heat resistant floc and binder that is free of crystalline silicate mineral powder, or ii) heat resistant polymeric film being free of crystalline silicate mineral powder, with the two outer layers containing crystalline silicate mineral powder, provides the multilayer laminate with additional functionally associated with the properties of the inner layer material. Since the inner layer is covered by the outer layers, the material composition suitable for use in the inner layer can be expanded because that inner layer does not need to have crystalline silicate mineral powder for use in electrical insulation.

Preferably, the nonwoven sheet comprises aramid paper. Aramid paper is advantageously used since aramid is a material characterized by high dielectric strength, excellent mechanical capacities, such as flexibility and resilience, and high thermal stability.

Preferably, the crystalline silicate mineral powder comprises mica.

According to a preferred configuration, aramid/mica insulating sheets are provided, in which the surface of the sheets is coated with a low-viscosity acrylate resin, for example a resin with a viscosity of between 5 cps and 150 cps, preferably equal to 10 cps. By virtue of the low viscosity, the penetration of the resin into the sheet is promoted, so that the impregnating resin layer has, for example, a thickness of at least 5 μm, preferably at least 10 μm, even more preferably at least 15 μm, in aramid sheets having a thickness of between 0.08 mm and 0.15 mm, and a thickness of at least 15 μm, preferably of at least 40 μm, in aramid sheets having a thickness of between 0.2 mm and 0.25 mm.

According to a further embodiment of the present invention, an insulating sheet is provided, in which the crystalline silicate mineral powder comprises mica.

This configuration is advantageous since mica can be used as an additive for increasing the partial discharge resistance. The reason for this is that mica is characterized by unique physical, thermal and electrical properties and high stability, resilience and adaptability.

According to a preferred configuration, an insulating sheet comprising aramid and mica is provided. In point of fact, an aramid paper which includes a certain amount of mica in its structure is characterized by higher resistance to partial discharge than an aramid paper free of additives.

According to one embodiment, each first and second nonwoven backing sheet of the multilayer laminate comprises 15 to 80 weight percent crystalline silicate mineral powder, 5 to 25 weight percent heat-resistant floc, and 20 to 60 weight percent binder, based on the total amount of said crystalline silicate mineral powder, floc, and binder in each first and second nonwoven backing sheet, and wherein each of the first and second surfaces of the multilayer laminate is coated with the impregnating resin, and each of the first and second surfaces are stabilized by a region of the said impregnating resin that both covers and extends into each of the first and second outer layers forming said first and second surfaces of the multilayer laminate. The region of impregnating resin extends into each outer layer a distance of 10 to 50 micrometers from each of said first and second surfaces, and further, the region of impregnating resin having a thickness of impregnating resin of from 5 to 50 micrometers on each of said first and second surfaces. In some embodiments, the region of impregnating resin has a thickness of impregnating resin on each of said first and second surfaces of from 5 to 25 micrometers. Preferably, the crystalline silicate mineral powder is mica.

In some preferred embodiments the multilayer laminate has a thermal conductivity of greater than 0.18 Watts per meter-Kelvin as measured per ASTM D5470; while in other embodiments the multilayer laminate has a thermal conductivity of greater than 0.25 Watts per meter-Kelvin as measured per ASTM D5470.

According to one embodiment, multilayer laminate has a total thickness of 0.10 to 0.4 millimeters, and in another embodiment the multilayer laminate has a total thickness of 0.15 to 0.35 millimeters.

In some embodiments, wherein each first or second nonwoven backing sheet in the multilayer laminate comprises 20 to 70 weight percent mica. In some other embodiments, wherein each first or second nonwoven backing sheet in the multilayer laminate comprises 30 to 60 weight percent mica.

According to a preferred embodiment, each first or second nonwoven backing sheet in the multilayer laminate comprises heat-resistant floc, preferably aramid floc; and the preferred aramid floc is poly (metaphenylene isophthalamide) floc. In some preferred embodiments, each first or second nonwoven backing sheet in the multilayer laminate comprises a binder, preferably a binder of aramid fibrids; and the preferred aramid fibrids are poly (metaphenylene isophthalamide) fibrids.

In some embodiments, the inner layer of the multilayer laminate comprises heat-resistant floc, preferably aramid floc; and the preferred aramid floc is poly (metaphenylene isophthalamide) floc. In some preferred embodiments, the inner layer in the multilayer laminate comprises a binder, preferably a binder of aramid fibrids; and the preferred aramid fibrids are poly (metaphenylene isophthalamide) fibrids.

According to a further embodiment of the present invention, an insulating sheet is provided, in which the coating comprises a compound of acrylate monomers and of acrylate oligomers.

The advantage of this configuration is that a compound of acrylate monomers with acrylate oligomers is characterized by high mobility and a low molecular weight, for example, a molecular weight of between 200 daltons and 500 daltons, and thus is capable of penetrating through the porosity of the insulating sheet.

According to a preferred configuration, an insulating sheet comprising aramid and mica is provided and is characterized by a coating of a resin composed of acrylate monomers and acrylate oligomers. The acrylate compounds penetrate into the aramid/mica paper, compacting and permanently fixing the mica powder in the aramid paper structure.

According to a further embodiment of the present invention, an insulating sheet is provided, in which the acrylate monomers are bifunctional or trifunctional methacrylates, for example 1,6-hexanediol diacrylate (HDDA), dipropylene glycol diacrylate (DPGDA), butanediol dimethacrylate (BDMA), neopentyl glycol diacrylate (NPGDA), isobornyl acrylate (IBOA), hydroxyethyl methacrylate (HEMA), hydroxyethyl acrylate (HEA), trimethylolpropane triacrylate (TMPTA), pentaerythrityl triacrylate (PETIA), tetramethylene dimethacrylate, hexanediol dimethacrylate, propoxylates and/or ethoxylates.

Mono-, di- or tri-functional acrylate monomers are particularly advantageous since they increase the bond density of the polymerization product.

According to a further embodiment of the present invention, an insulating sheet is provided, in which the acrylate oligomers are urethane acrylate, epoxy acrylate and/or polyester acrylate.

According to a further embodiment of the present invention, an insulating sheet is provided, in which the impregnating resin coating comprises an unsaturated polyester imide material.

This configuration is particularly advantageous since the polyester imide resin is capable of penetrating deeply into the matrix of the insulating sheet, avoiding any possibility of dust shedding and falling off, thereby improving the processability of the insulating material. Furthermore, it is possible to transform this polyester imide resin, normally used for impregnating electric motors, from a thermosetting coating to a UV-polymerizable coating by simply adding a photoinitiator to the resin mixture.

According to a further embodiment of the present invention, an insulating sheet is provided, in which the impregnating resin also comprises a polymerization photoinitiator, in particular a UV polymerization photoinitiator.

Nonlimiting examples of photoinitiators used in the present invention include Omnirad TPO-L, 2-hydroxy-2-methyl-1-phenylpropanone, diphenyl-2,4,6-trimethylbenzoylphosphine oxide (TPO), phosphine oxide (BAPO), phenylbis(2,4,6-trimethylbenzoyl) phosphine oxide (BAPO), 1-hydroxycyclohexyl phenyl ketone (HCPK), 2-hydroxy-2-methyl-1-phenyl-1-propanone (HMPP), or the photoinitiators belonging to the class of bi-acyl phosphate oxide polymers (TPO), or the photoinitiators belonging to the class of α-hydroxy ketones.

The advantage of this configuration is that the polymerization of the impregnating resin takes place after applying the resin to the insulating sheet and following exposure to UV light. In this manner, the impregnating resin can penetrate deep into the insulating paper and can compact it, preventing, for example, the detachment and shedding of mica in the subsequent processing steps.

According to a further embodiment of the present invention, an insulating paper is provided, in which the impregnating resin also comprises an organic solvent, for example methyl ethyl ketone.

The advantage of this configuration is that the viscosity of the impregnating resin is lowered. According to a preferred configuration, the impregnating resin comprises methyl ethyl ketone (MEK), which is an organic solvent characterized by a high evaporation rate and which is widely used in acrylic and polyurethane paint and coating thinners, to lower their viscosity.

According to some embodiments the heat resistant polymeric film ii) of the inner layer of the multilayer laminate comprises polyethylene terephthalate (PET), polyethylene napthalate (PEN), polyphenylene sulfide (PPS), polyimide, polyether ether ketone (PEEK), other polyarylether ketone (PAEK)-type polymers, or mixtures thereof.

According to an additional embodiment, the heat resistant polymeric film ii) of the inner layer of the multilayer laminate further comprises aluminium oxide or boron nitride.

According to another embodiment, the heat resistant polymeric film ii) of the inner layer of the multilayer laminate is a thermoplastic, and the first outer layer, the inner layer, and the second outer layer are bound together face-to-face by said thermoplastic film.

In still another embodiment, the of heat resistant floc and binder i) of the inner layer of the multilayer laminate is an aramid paper comprising aramid floc and aramid fibrid binder and being free of mica.

According to a further embodiment of the present invention, a multilayer laminate is provided, wherein each of the first and second nonwoven backing sheets comprises an amount of impregnating resin based on acrylate derivatives comprised between 1 g and 10 g per square meter of insulating sheet.

According to a further embodiment of the present invention, a method is provided for producing an insulating sheet, comprising the following steps:

a) provision of an nonwoven backing sheet comprising 15 to 80 percent by weight of a crystalline silicate mineral powder, for example mica;
b) depositing a coating layer of an impregnating resin based on acrylate derivatives onto the backing sheet so as to obtain a resin-impregnated sheet.

This configuration is particularly advantageous since the backing sheet, for example made of aramid paper containing mica, is impregnated with a coating resin layer that is capable of penetrating deep into the matrix. In this manner, the mica is prevented from becoming detached from the aramid paper following exposure to various mechanical stresses during implementation processes, but the electrical properties of the aramid/mica paper are not affected. In particular, aramid/mica sheets are characterized by higher resistance to partial discharge than aramid sheets.

The method of the present invention thus makes it possible to simplify the subsequent processing and lamination of aramid/mica insulating sheets and to facilitate their use as insulating materials for insertion, for example, in the stator slots of electric motors.

Preferably, the aramid/mica backing sheets are supplied on reels and the impregnating resin is applied to the sheets by means of a "roll to roll" process.

According to a further embodiment of the present invention, a method is provided for producing an insulating sheet, in which the coating layer comprises a compound of acrylate monomers and of acrylate oligomers.

The advantage of this configuration is that a compound of acrylate monomers with acrylate oligomers is characterized by high mobility and a low molecular weight, for example a molecular weight of between 200 daltons and 500 daltons, and is thus capable of penetrating the porosity of the insulating sheet.

In particular, acrylate compounds are capable of penetrating deep into the aramid/mica paper, compacting and permanently fixing the mica powder into the structure of the aramid paper.

According to a further embodiment of the present invention, a method is provided for the production of an insulating sheet, in which the acrylate monomers are bifunctional or trifunctional methacrylates, for example 1,6-hexanediol diacrylate (HDDA), dipropylene glycol diacrylate (DPGDA), butanediol dimethacrylate (BDMA), neopentyl glycol diacrylate (NPGDA), isobornyl acrylate (IBOA), hydroxyethyl methacrylate (HEMA), hydroxyethyl acrylate (HEA), trimethylolpropane triacrylate (TMPTA), pentaerythrityl triacrylate (PETIA), tetramethylene dimethacrylate, hexanediol dimethacrylate, propoxylates and/or ethoxylates.

According to a further embodiment of the present invention, a method is provided for producing an insulating sheet, in which the acrylate oligomers are urethane acrylate, epoxy acrylate and/or polyester acrylate.

According to a further embodiment of the present invention, a method is provided for producing an insulating sheet, in which the coating layer comprises an unsaturated polyester imide material.

This configuration is particularly advantageous since the polyester imide resin is capable of penetrating deep into the matrix of the insulating sheet, avoiding any possibility of dust shedding and falling off, thereby improving the processability of the insulating material. In addition, it is possible to transform this polyester imide resin, normally used for impregnating electric motors, into a UV-polymerizable coating by adding a photoinitiator to the resin mixture.

According to a further embodiment of the present invention, a method is provided for producing an insulating sheet, in which the coating layer comprises an organic solvent and the method also comprises the following step:

c) evaporation of the organic solvent by drying the resin-impregnated sheet.

The advantage of this configuration is that an organic solvent, for example, methyl ethyl ketone, is added to the coating formulation for the purpose of improving the deep penetration of the acrylate oligomers and monomers. The organic solvent is used as an unreactive diluent for the purpose of reducing the viscosity of the coating formulation, to allow the application of the wet coating by means of rotogravure and thus obtain a uniform and homogeneous surface. When the coating resin has penetrated into the backing sheet, the organic solvent is evaporated off.

According to a further embodiment of the present invention, a method is provided for producing an insulating sheet, in which the impregnating resin also comprises a polymerization photoinitiator, in particular a UV polymerization photoinitiator, for example Omnirad TPO-L or 2-hydroxy- 2-methyl-1-phenylpropanone, and in which the method also comprises the following step:

d) exposing the resin-impregnated sheet to UV radiation to bring about the polymerization of the coating layer.

The advantage of this configuration is that polymerization of the impregnating resin takes place after applying the resin to the insulating sheet and following exposure to UV light. In this manner, the impregnating resin can penetrate deep into the insulating paper and can compact it, preventing, for example, the detachment and shedding of mica in the subsequent processing steps.

Preferably, the UV polymerization process is induced by exposure to an ultraviolet lamp, preferably having a wavelength in the range between 200 nm and 400 nm, whose emissions are concentrated on the substrate onto which a liquid formulation containing the photoinitiator has been applied. Following the UV light irradiation, radicals are generated that interact with the impregnating resin, bringing about polymerization and crosslinking of the formulation, which changes from liquid to solid.

The aramid/mica paper thus impregnated, and the multilayer laminate may advantageously be used, for example, in the construction of electric motors, as a secondary insulator (slot insulator).

According to a further embodiment of the present invention, a laminate is provided comprising at least one insulating sheet such as those described above and at least one plastic film layer, in which the insulating sheet is laminated onto one side of the plastic film layer, preferably so as to form the outer side of the laminate.

This configuration is particularly advantageous since the combination of at least one aramid paper insulating sheet and at least one plastic film layer makes it possible to obtain an insulating laminate which has physical, dielectric, thermal and mechanical properties that can be adapted to the user's needs.

Preferably, the various layers of aramid sheets and plastic film adhere to each other by means of suitable adhesives.

According to a preferred configuration, a laminate is provided comprising an insulating sheet of aramid paper that is adhered firmly to one or both faces of a layer of plastic film, so that this insulating sheet forms the outer layer of the laminate. The outer layer of the laminate refers to the layer that is in contact with the external environment.

According to a further preferred configuration, a laminate is provided comprising several layers of plastic film alternating with aramid paper insulating sheets, in which said insulating sheet forms at least one outer layer of the laminate. For example, the laminate may comprise alternating layers of plastic film and of insulating paper sheets, and may have one outer side formed by an aramid paper sheet and one outer side formed by a plastic film layer, or it may have both outer sides formed by aramid paper sheets.

According to a further preferred configuration, a laminate is provided comprising one or more layers of plastic film and one or more insulating sheets of aramid paper laminated together in any order, in which said insulating sheet forms at least one outer layer of the laminate. For example, the laminate may comprise one or more layers of plastic film and of insulating paper sheets laminated together in any order, and may have an outer side formed by an aramid paper sheet and an outer side formed by a plastic film layer, or it may have both outer sides formed by aramid paper sheets.

According to a further embodiment of the present invention, a laminate such as that described above is provided, comprising a plurality of insulating sheets and a plurality of plastic film layers, in which the insulating sheets are alternated with the plastic film layers, preferably so as to form the outer side of said laminate.

This configuration is particularly advantageous since the combination of a plurality of insulating sheets of aramid paper and a plurality of layers of plastic film makes it possible to obtain an insulating laminate which has physical, dielectric, thermal and mechanical features that can be adapted to the user's needs.

Preferably, the various layers of aramid sheets and of plastic film adhere to each other by means of suitable adhesives.

According to a further embodiment of the present invention, an electric motor is provided comprising a multilayer laminate comprising sheets such as those described above. One preferred method for producing such a multilayer laminate comprising at least three layers and having a first surface and a second outer surface, is characterized in that the method comprises the steps of:

a) providing a first outer layer that is a first nonwoven backing sheet (7) containing a crystalline silicate mineral powder, the first outer layer comprising a coating of an impregnating resin based on acrylate derivatives, b) providing an inner layer that comprises either:

i) heat resistant floc and binder and being free of crystalline silicate mineral powder, or ii) heat resistant polymeric film being free of crystalline silicate mineral powder, and c) providing a second outer layer that is a second nonwoven backing sheet (7) containing a crystalline silicate mineral powder, the second outer layer comprising a coating of an impregnating resin based on acrylate derivatives, d) binding the first outer layer, the inner layer, and the second outer layer together face-to-face, with the inner layer being between the first and second outer layers, wherein the multilayer laminate has a total of 15 to 80 weight percent crystalline silicate mineral powder, based on the total amount of said crystalline silicate mineral powder, floc, and binder in the multilayer laminate.

This configuration is particularly advantageous since it is possible to insulate the phases from the stator of the electric motor by means of a multilayer laminate characterized by high resistance to partial discharge and having excellent mechanical properties even under extreme working conditions, for example at high voltages or during exposure to mechanical stresses.

BRIEF DESCRIPTION OF THE FIGURES

The present invention will be described with reference to the attached figures in which the same numbers and/or reference marks indicate the same and/or similar and/or corresponding parts of the system.

DETAILED DESCRIPTION

Figure 1:
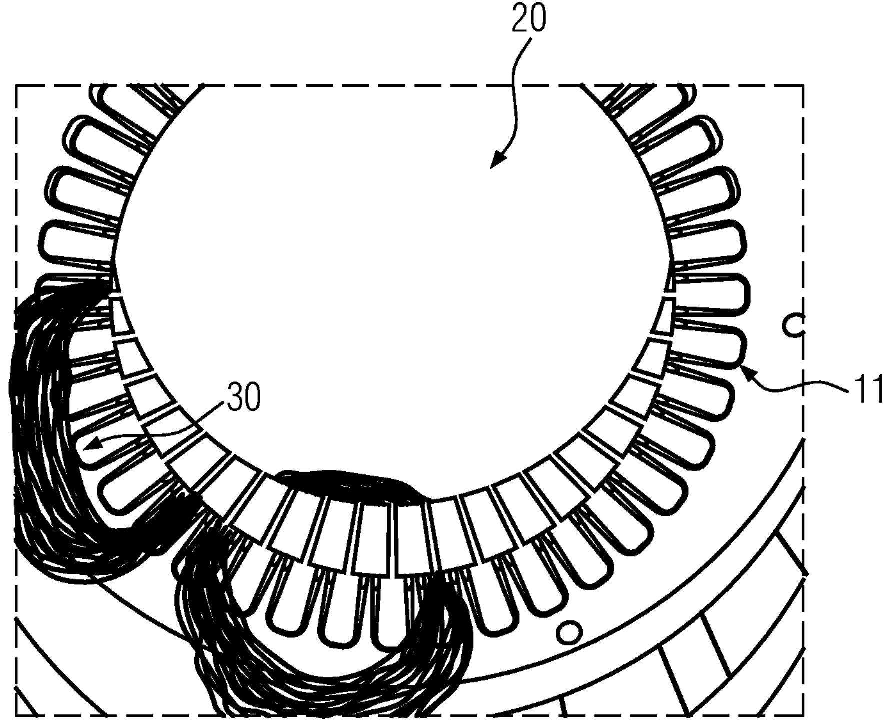
FIG. 1 schematically shows an aramid/mica insulating sheet used as an insulating coating for the stator slots of an electric motor.

In the text hereinbelow, the present invention is described with reference to particular embodiments as illustrated in the attached figures. However, the present invention is not limited to the particular embodiments described in the following detailed description and represented in the figures, but rather the described embodiments simply exemplify the various aspects of the present invention, the scope of which is defined by the claims. Further modifications and variations of the present invention will emerge clearly to a person skilled in the art.

The present invention relates to a multilayer laminate comprising at least one nonwoven backing sheet 7 comprising a crystalline silicate mineral powder, in particular mica, impregnated with a coating of a resin based on acrylate derivatives which penetrates deep into the sheet itself. By nonwoven backing sheet, it is meant a sheet structure produced by bonding and/or interlocking of fibrous material into a random web or mat by mechanical, chemical, or thermal methods, and combinations thereof. One preferred type of nonwoven backing sheet is a paper.

Preferably the nonwoven backing sheet is an aramid paper comprising aramid floc, aramid fibrids, or mixtures thereof. The aramid paper preferably contains meta-aramid fibrids as a binder along with aramid fiber or other thermostable floc or fiber or mixtures of such flocs or fibers. By thermostable it is meant that the given floc or fiber can withstand a long exposure to the end-use temperature without significant degradation (usually, to remain at least 50% of its initial properties after exposure for 100,000 hours to the necessary temperature, typically for example, greater than 180° C.).

The term "aramid", as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide) (MPD-I). U.S. Pat. Nos. 3,063,966; 3,227,793; 3,287,324; 3,414,645; and 5,667,743 are illustrative of useful methods for making aramid fibers that could be used to make aramid floc.

The preferred aramid floc is a meta-aramid floc, and especially preferred is floc made from the meta-aramid poly(meta-phenylene isophthalamide) (MPD-I). The term "floc", as used herein, means fibers that are cut to a short length and that are customarily used in the preparation of papers. Typically, floc has a length of from about 3 to about 20 millimeters. A preferred length is from about 3 to about 7 millimeters. Floc is normally produced by cutting continuous fibers into the required lengths using well-known methods in the art.

The term "fibrids", as used herein, means very small, nongranular, fibrous or film-like particles with at least one of their three dimensions being of minor magnitude relative to the largest dimension. These particles are prepared by precipitation of a solution of polymeric material using a non-solvent under high shear. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I). Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

By aramid paper, as used herein, it is meant a planar sheet made from one or more plies or layers of aramid materials that are prepared by paper-making processes. Representative devices and machinery that can be used to make plies or layers include continuous-processing equipment such as, for example without limitation to, a Fourdrinier or inclined wire machine, or batch-processing equipment such as those that make paper by hand in a hand-sheet mold containing a forming screen.

To make the mica-containing sheets or papers, in one preferred method, a mixture of the desired amounts of mica and fibrous material is combined in water to make an aqueous dispersion; and then this mica-containing aqueous dispersion is then used to make the mica-containing nonwoven sheets by a suitable nonwoven process. For one specific example, to make a mica-containing aramid paper, mica, MPD-I fibrids, and MPD-I floc in the amounts previously mentioned herein, are combined in water to form a mica-containing aqueous dispersion suitable as a furnish for papermaking. The mica-containing dispersion is then supplied to the headbox of a papermaking machine and a wet laid web is formed. The speed of the paper machine is controlled to provide the desired thickness of the wet laid web. The wet laid web is then dried to form an unconsolidated mica-containing aramid formed web or layer, which can be further consolidated by calendering or can be combined with other like formed web(s) and then consolidated by calendering.

As used herein, the term "layer" as used in a), b), or c) in the multilayer laminate, preferably refers to a thin planar material of a specific composition; for example, a paper or a film. As used herein, the term "face" refers to either of the two major surfaces of the layer or paper or film (i.e., one side or the other of the layer or paper or film).

A nonexhaustive list of mica types that may be used for the present invention includes: muscovite, phlogopite, fluorophlogopite, and synthetic mica.

The acrylate resin is obtained following condensation between a hydroxylated resin and an acrylic or methacrylic acid. The acrylate resin is preferably diluted in a reactive acrylate solvent and in an unreactive organic solvent, for example methyl ethyl ketone, in order to lower its viscosity in application and to promote the penetration of the coating into the aramid paper. In this manner, the aramid/mica paper is compacted deep down and the detachment and shedding of the mica in the subsequent processing steps are hindered.

The polymerization of the coating resin is induced after the coating layer has been applied to the aramid/mica sheet and after the coating has penetrated into the aramid/mica sheet. In particular, polymerization of the coating resin is induced by the addition of a photoinitiator and exposure to UV light, preferably with a wavelength in the range between 200 nm and 400 nm.

Nonlimiting examples of photoinitiators used in the present invention include Omnirad TPO-L, 2-hydroxy-2-methyl-1-phenylpropanone, diphenyl-2,4,6-trimethylbenzoylphosphine oxide (TPO), phosphine oxide (BAPO), phenylbis(2,4,6-trimethylbenzoyl) phosphine oxide (BAPO), 1-hydroxycyclohexyl phenyl ketone (HCPK), 2-hydroxy-2- methyl-1-phenyl-1-propanone (HMPP), or the photoinitiators belonging to the class of bi-acylphosphate oxide polymers (TPO), or the photoinitiators belonging to the class of α-hydroxy ketones.

In a preferred configuration, the insulating sheet 10 may be used for insulating rotating or static components of electrical machines.

In a further preferred configuration, the insulating sheet 10 may be used as an outer layer on one or both sides of a composite laminate of plastic film layers, and said laminate may be used for insulating rotating or static components of electrical machines. In a further preferred configuration, one or more insulating sheets 10 may be used to form a multilayer laminate, in which the laminate comprises a plurality of plastic film layers laminated together, preferably alternating with layers of aramid paper, and the laminate may be used for insulating rotating or static components of electrical machines.

The insulating sheet 10 or the laminates described above may be used, in rotating electrical machines, for insulation of the stator slots, for closing same, and also for separating phases on the head of windings; in static electrical machines, they may be used as interlayer insulators.

For example, FIG. 1 shows a suitably sized insulating sheet 11 used for insulating the stator 20 slot of an electric motor. Preferably, aramid/mica insulating sheets 11, impregnated with resin, are cut into segments essentially equal in length to the depth of the stator 20 and equal in width to the development of the slot to be insulated. The insulating sheet 11 may advantageously be inserted into the grooves of stator 20 of an electric motor by pushing it using a presser. The function of the insulating sheet 11 is "secondary insulation": the current passes through the copper winding 30, which already has its own primary insulation, while the slot insulating sheet 11 contributes toward separating the magnetic sheet metal from the copper winding 30.

The process for producing aramid/mica insulating sheets impregnated with a coating layer is described with reference to FIG. 2.

Preformed aramid/mica backing sheets 7 are preferably supplied in reels, having, for example, a width equal to 1 m and a length of between 100 m and 2000 m. The backing sheets 7 may be, for example, DuPont™ Nomex® 818 sheets, such as those described in the document "DuPont™ Nomex® 818, Technical Data Sheet, @ Copyright 2016 DuPont." The backing sheets 7 may include, for example, an amount of mica equal to 50% of the total composition.

Figure 2:
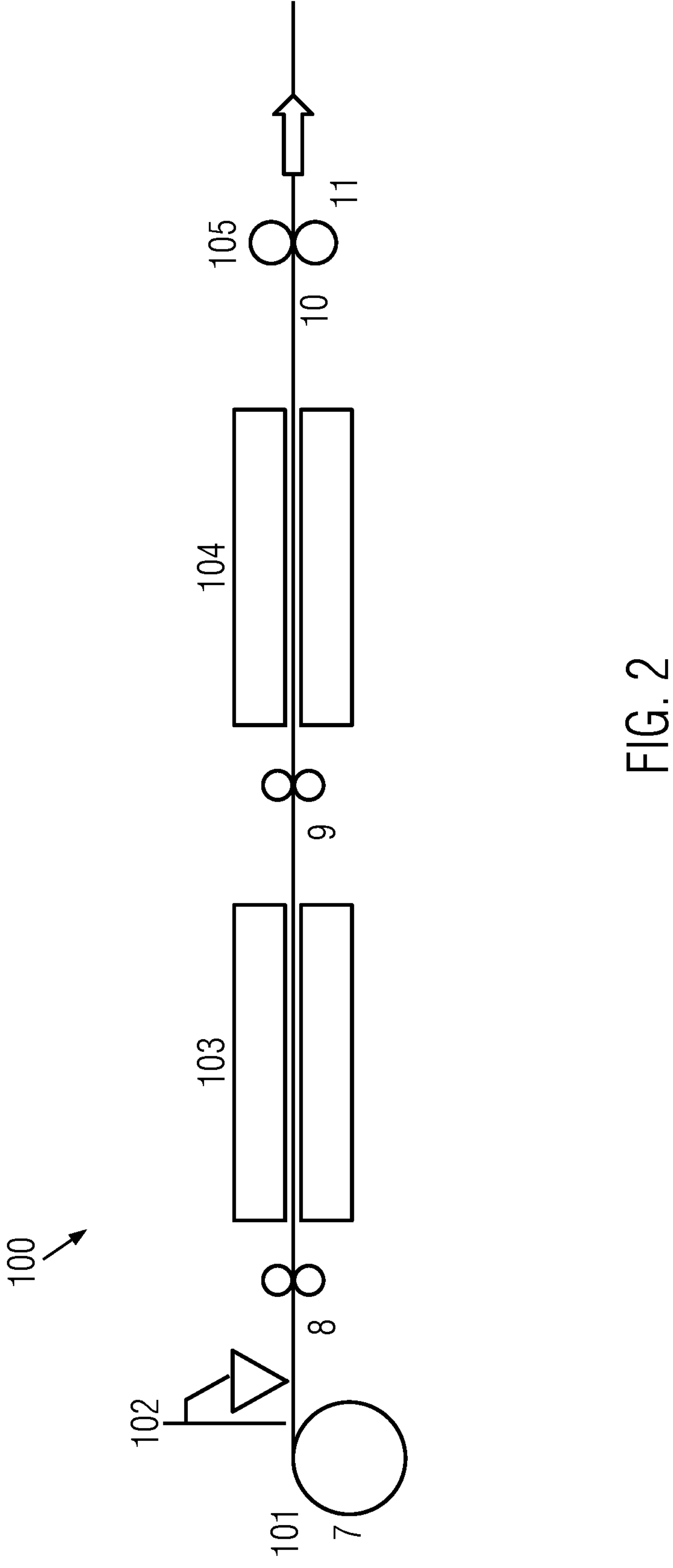
FIG. 2 schematically shows the process for producing aramid/mica insulating sheets also comprising a coating resin layer, according to one embodiment of the present invention.

The acrylate resin coating is applied onto the preformed aramid/mica backing sheets 7 by means of a "roll to roll" process schematically illustrated in FIG. 2.

An unwinder 101 supplies the production line 100 with an aramid/mica backing reel 7. A liquid formulation is prepared comprising a resin based on acrylate monomers and acrylate oligomers, for example an unsaturated polyester imide resin, to which a UV polymerization photoinitiator is added, for example Omnirad TPO-L or 2-hydroxy-2-methyl-1-phenylpropanone, and an unreactive organic solvent, for example methyl ethyl ketone (MEK), to lower the viscosity of the resin itself and to allow better penetration of the resin into the aramid paper matrix. Said liquid formulation is applied onto one of the surfaces of the aramid/mica backing sheet 7 at the application station 102, thus producing an impregnated aramid/mica sheet 8, i.e. a sheet further comprising the liquid formulation. Preferably, the liquid formulation is applied onto both surfaces of the backing sheet 7, for example it is first applied to one side and then to the opposite side.

The liquid formulation is applied to the aramid/mica backing sheets 7 preferably by the gravure or gravure engraved roller coating technique, or the Meyer bar technique, or impregnation using Foulard machines. In the configuration with coating by gravure engraved roller, the liquid formulation is initially collected in the cavities of the engraved roller and is subsequently transferred onto the aramid/mica backing sheet 7. The amount of liquid formulation applied depends on the depth of the cells of the gravure engraved roller. For example, it is possible to apply an amount of liquid formulation in the range between 10 g and 20 g per square meter of backing sheet 7, where the liquid formulation comprises a solution containing between 10% by weight and 50% by weight of acrylate resin in an unreactive organic solvent, so as to obtain a dry deposit of acrylate resin of between 1 g and 10 g per square meter of backing sheet 7 and to reach an impregnation depth of between 5 μm and 50 μm.

After application of the liquid formulation, the impregnated sheet 8 reaches the heating station 103 comprising an industrial oven, where the unreactive organic solvent is evaporated off. For example, the impregnated sheet 8 is heated to a temperature in the range between 90° C. and 120° C. to evaporate off the solvent part and to dry the coating. At the end of the heating process, a sheet 9 is obtained in which the unreactive organic solvent has evaporated off.

The sheet 9 then reaches the UV irradiation station 104, where it is exposed to radiation emitted by an ultraviolet lamp. In particular, the UV radiation is focused on a substrate onto which a liquid formulation containing the photoinitiator has been applied. As a result of the UV light irradiation, free radicals are generated which interact with the acrylate resin that has penetrated into the sheet and induce polymerization of the formulation, which changes from liquid to solid. At the end of the UV exposure, an insulating sheet 10 is thus obtained in which the acrylate-based impregnating resin is polymerized.

Preferably, the operations of liquid formulation application, organic solvent evaporation and UV irradiation are repeated for the opposite side of the insulating sheet 10. For example, the insulating sheet 10 comprising a resin-impregnated surface can be returned to the application station 102, where the liquid formulation is applied to the opposite surface, and then it can be passed once again through the heating station 103 and the UV irradiation station 104.

Finally, the insulation sheet 10 is cut into smaller sheets, from which individual pieces of insulation 11 are made. Preferably, the insulating sheet 10 is cut into reels with a width equal to the development of the stator slot, for example with a width of between 1 cm and 10 cm.

Although the present invention has been described with reference to the embodiments described above, it is clear to a person skilled in the art that various modifications, variations and improvements of the present invention in light of the teaching described above and within the scope of the appended claims are possible without departing from the subject matter and the scope of protection of the invention.

For example, although it has been described that the crystalline silicate mineral powder comprises mica, it is clear that there may be other crystalline silicate mineral powders, for example including vermiculite, calcined clay, silica, talc, wollastonite, and/or combinations thereof. For example, each of the listed powders may be used with aramid fibers as a reinforcing element.

For example, although it has been described that the nonwoven backing sheet is preferably a paper structure comprising aramid fibers, it is clear that there may be different types of fibers, for example, glass fibers, a mixed aramid paper, or a film of polyamide-imide, polyester, polyimide ether, polyether ketone, polyether sulfone, polysulfide, polyimide, or the like. For example, each of the indicated reinforcing elements may be used to contain mica as a crystalline silicate mineral powder.

Finally, those areas considered to be known to experts in the field have not been described to avoid unnecessarily overshadowing the described invention.

For example, the process of gravure coating, or gravure engraved roller coating, Meyer bar, or Foulard machine impregnation have not been described in detail since they are considered to be known to those skilled in the art.

For example, the process of deposition and polymerization of the impregnating resin on an aramid/mica paper by means of a "roll to roll" process has not been described in detail, as it is considered to be known to those skilled in the art.

In one preferred method for producing a multilayer laminate comprising at least three layers and having a first surface and a second outer surface is characterized in that the method comprises the steps of:

- a) providing a first outer layer that is a first nonwoven backing sheet (7) containing a crystalline silicate mineral powder, the first outer layer comprising a coating of an impregnating resin based on acrylate derivatives,
- b) providing an inner layer that comprises either:
  - i) heat resistant floc and binder and being free of crystalline silicate mineral powder, or
  - ii) heat resistant polymeric film being free of crystalline silicate mineral powder, and
- c) providing a second outer layer that is a second nonwoven backing sheet (7) containing a crystalline silicate mineral powder, the second outer layer comprising a coating of an impregnating resin based on acrylate derivatives,
- d) binding the first outer layer, the inner layer, and the second outer layer together face-to-face, with the inner layer being between the first and second outer layers, wherein the multilayer laminate has a total of 15 to 80 weight percent crystalline silicate mineral powder, based on the total amount of said crystalline silicate mineral powder, floc, and binder in the multilayer laminate.

In some embodiments, the layers are bound with an adhesive. In some embodiments, the first outer layer, the inner layer, and the second outer layer are coextensive with each other in the multilayer laminate.

In some embodiments, the multilayer laminate has a total of 20 to 70 weight percent crystalline silicate mineral powder, based on the total amount of said crystalline silicate mineral powder, floc, and binder in the multilayer laminate. In some embodiments, the multilayer laminate has a total of 30 to 60 weight percent crystalline silicate mineral powder, based on the total amount of said crystalline silicate mineral powder, floc, and binder in the multilayer laminate.

In some preferred embodiments, the heat-resistant floc in the multilayer laminate is aramid floc, especially aramid floc that is poly (metaphenylene isophthalamide) floc. In some preferred embodiments, the binder includes aramid fibrids, especially aramid fibrids that are poly (metaphenylene isophthalamide) fibrids.

In some embodiments, the surfaces of the multilayer laminate comprise a coating comprising a compound of acrylate monomers and of acrylate oligomers.

In some embodiments, the heat resistant polymeric film ii) of the inner layer of the multilayer laminate comprises polyethylene terephthalate (PET), polyethylene napthalate (PEN), polyphenylene sulfide (PPS), polyimide, polyether ether ketone (PEEK), other polyarylether ketone (PAEK)-type polymers, or mixtures thereof.

In some embodiments, the first and second outer layers are insulating sheets as previously described herein; and in some embodiments the first and second outer layers comprise aramid paper. Specifically, in some preferred embodiments, each of the first and second outer layers comprises 15 to 80 weight percent crystalline silicate mineral powder, 5 to 25 weight percent heat-resistant floc, and 20 to 60 weight percent binder, based on the total amount of said crystalline silicate mineral powder, floc, and binder in each first and second outer layer; and each of the first and second surfaces of the multilayer laminate is coated with the impregnating resin, and each of the first and second surfaces are stabilized by a region of the said impregnating resin that both covers and extends into each of the first and second outer layers forming said first and second surfaces of the multilayer laminate; the region of impregnating resin extending into each outer layer a distance of 10 to 50 micrometers from each of said first and second surfaces, and further, the region of impregnating resin having a thickness of impregnating resin of from 5 to 50 micrometers on each of said first and second surfaces. In some embodiments, the region of impregnating resin has a thickness of impregnating resin on each of said first and second surfaces of from 5 to 25 micrometers.

Accordingly, the invention is not limited to the embodiments described above, but is only limited by the scope of protection of the appended claims.

REFERENCE NUMBERS

7: backing sheet
8: sheet impregnated with resin
9: sheet from which the unreactive organic solvent is evaporated
10: insulating sheet
11: cut insulating sheet
20: stator slot
30: copper winding
100: coating roll-to-roll deposition and polymerization station
101: unwinder
102: liquid formulation application station
103: heating station
104: UV irradiation station
105: cutting station

The invention claimed is:

1. A multilayer laminate having a first surface and a second surface, the multilayer laminate comprising at least three layers, characterized in that the layers comprise

- a) a first outer layer that is a first nonwoven backing sheet containing a crystalline silicate mineral powder,
- b) an inner layer that comprises either:
  - i) heat resistant floc and binder and being free of crystalline silicate mineral powder, or
  - ii) heat resistant polymeric film being free of crystalline silicate mineral powder,
- c) a second outer layer that is a second nonwoven backing sheet containing a crystalline silicate mineral powder, wherein first outer layer, the inner layer, and the second outer layer are coextensive with each other and bound together face-to-face, the inner layer being between the first and second outer layers, and wherein the multilayer laminate has a total of 15 to 80 weight percent crystalline silicate mineral powder, based on the total amount of said crystalline silicate mineral powder, floc, and binder in the multilayer laminate, and said multilayer laminate also comprises a coating of an impregnating resin based on acrylate derivatives; and wherein said crystalline silicate mineral powder comprises mica, and wherein each first and second nonwoven backing sheet comprises 15 to 80 weight percent crystalline silicate mineral powder, 5 to 25 weight percent heat-resistant floc, and 20 to 60 weight percent binder, based on the total amount of said crystalline silicate mineral powder, floc, and binder in each first and second nonwoven backing sheet, and wherein each of the first and second surfaces of the multilayer laminate is coated with the impregnating resin, and each of the first and second surfaces are stabilized by a region of the said impregnating resin that both covers and extends into each of the first and second outer layers forming said first and second surfaces of the multilayer laminate, the region of impregnating resin extending into each outer layer a distance of 10 to 50 micrometers from each of said first and second surfaces, and further, the region of impregnating resin having a thickness of impregnating resin of from 5 to 50 micrometers on each of said first and second surfaces.

2. The multilayer laminate according to claim 1 wherein the first or second nonwoven backing sheet comprises 20 to 70 weight percent mica.

3. The multilayer laminate according to claim 1 wherein the heat-resistant floc is aramid floc.

4. The multilayer laminate according to claim 1 wherein the binder includes aramid fibrids.

5. The multilayer laminate as claimed in claim 1, in which said impregnating resin also comprises a polymerization photoinitiator.

6. The multilayer laminate as claimed in claim 1, wherein the heat resistant polymeric film ii) of the inner layer of the multilayer laminate comprises polyethylene terephthalate (PET), polyethylene napthalate (PEN), polyphenylene sulfide (PPS), polyimide, polyether ether ketone (PEEK), other polyarylether ketone (PAEK) polymers, or mixtures thereof.

7. The multilayer laminate according to claim 1, wherein the heat resistant polymeric film ii) of the inner of the multilayer laminate layer further comprises aluminium oxide or boron nitride.

8. The multilayer laminate according to claim 1, wherein the heat resistant polymeric film ii) of the inner layer is a thermoplastic, and the first outer layer, the inner layer, and the second outer layer are bound together face-to-face by said thermoplastic film.

9. The multilayer laminate according to claim 1, wherein the of heat resistant floc and binder i) of the inner layer is an aramid paper comprising aramid floc and aramid fibrid binder and being free of mica.

10. An electric motor comprising the multilayer laminate as claimed in claim 1.

11. A method for producing a multilayer laminate having a first surface and a second surface, the multilayer laminate comprising at least three layers, characterized in that the method comprises the steps of:

a) providing a first outer layer that is a first nonwoven backing sheet containing a crystalline silicate mineral powder, the first outer layer comprising a coating of an impregnating resin based on acrylate derivatives, b) providing an inner layer that comprises either:

i) heat resistant floc and binder and being free of crystalline silicate mineral powder, or ii) heat resistant polymeric film being free of crystalline silicate mineral powder, and c) providing a second outer layer that is a second nonwoven backing sheet containing a crystalline silicate mineral powder, the second outer layer comprising a coating of an impregnating resin based on acrylate derivatives, d) binding the first outer layer, the inner layer, and the second outer layer together face-to-face, with the inner layer being between the first and second outer layers, wherein the multilayer laminate has a total of 15 to 80 weight percent crystalline silicate mineral powder, based on the total amount of said crystalline silicate mineral powder, floc, and binder in the multilayer laminate;

wherein said crystalline silicate mineral powder comprises mica, and wherein each of the first and second outer layers comprises 15 to 80 weight percent crystalline silicate mineral powder, 5 to 25 weight percent heat-resistant floc, and 20 to 60 weight percent binder, based on the total amount of said crystalline silicate mineral powder, floc, and binder in each first and second outer layer, and wherein each of the first and second surfaces of the multilayer laminate is coated with the impregnating resin, and each of the first and second surfaces are stabilized by a region of the said impregnating resin that both covers and extends into each of the first and second outer layers forming said first and second surfaces of the multilayer laminate, the region of impregnating resin extending into each outer layer a distance of 10 to 50 micrometers from each of said first and second surfaces, and further, the region of impregnating resin having a thickness of impregnating resin of from 5 to 50 micrometers on each of said first and second surfaces.

12. The method of claim 11 wherein the region of impregnating resin has a thickness of impregnating resin on each of said first and second surfaces of from 5 to 25 micrometers.

13. The method of claim 11 wherein the layers are bound with an adhesive.

14. The method of claim 11 wherein the multilayer laminate has a total of 20 to 70 weight percent crystalline silicate mineral powder, based on the total amount of said crystalline silicate mineral powder, floc, and binder in the multilayer laminate.

15. The method of claim 11 wherein the heat-resistant floc is aramid floc.

16. The method of claim 11 wherein the binder includes aramid fibrids.

* * * * *